US006470612B1

(12) United States Patent
Pountney

(10) Patent No.: US 6,470,612 B1
(45) Date of Patent: Oct. 29, 2002

(54) CONNECTING ASSEMBLY FOR JOINING TWO PANELS AND MOUNTING THE JOINED PANELS ON A SUPPORT

(75) Inventor: David Grenville Pountney, Auckland (NZ)

(73) Assignee: Dynamic Marketing Group Limited, Auckland (NZ)

( * ) Notice: Subject to any disclaimer, the term of this patent is extended or adjusted under 35 U.S.C. 154(b) by 0 days.

(21) Appl. No.: 09/719,873

(22) PCT Filed: Jun. 23, 1999

(86) PCT No.: PCT/NZ99/00091

§ 371 (c)(1),
(2), (4) Date: Mar. 8, 2001

(87) PCT Pub. No.: WO00/00948

PCT Pub. Date: Jan. 6, 2000

(30) Foreign Application Priority Data

| Jun. 26, 1998 | (NZ) | 330810 |
| Aug. 14, 1998 | (NZ) | 331393 |
| Aug. 31, 1998 | (NZ) | 331630 |

(51) Int. Cl.[7] ............................................. G09F 7/02
(52) U.S. Cl. ..................... 40/611; 411/178; 411/383
(58) Field of Search ................................. 411/383, 178, 411/384, 338, 400, 401; 40/611, 631, 202

(56) References Cited

U.S. PATENT DOCUMENTS

| 3,049,323 A | * | 8/1962 | Peterka |
| 3,823,526 A | * | 7/1974 | Rose |
| 4,043,239 A | * | 8/1977 | DeFusco |
| 4,848,405 A | * | 7/1989 | Albrecht |
| 5,397,092 A | * | 3/1995 | Black |
| 5,542,777 A | * | 8/1996 | Johnson |

* cited by examiner

Primary Examiner—Flemming Saether
(74) Attorney, Agent, or Firm—Young & Thompson

(57) ABSTRACT

An assembly and method for mounting two panels where a first member is mounted to, into or from a support, a second member is threaded to said mounted first member, and a third member is threaded to said second member when it is already threadingly engaged to said mounted first member, wherein said second member has a portion extending through a hole in a first panel and into said first member so as to retain between the first and second member the first panel and wherein the third member has a portion extending through a hole in a first panel and into said second member so as to retain between the first and second member the second panel.

14 Claims, 14 Drawing Sheets

CONNECTING ASSEMBLY FOR JOINING TWO PANELS AND MOUNTING THE JOINED PANELS ON A SUPPORT

TECHNICAL FIELD

This invention relates to an assembly for mounting two or more panels or sheets. The invention also relates to an assembly of the said two or more panels or sheets and said assembly for mounting those two or more panels or sheets.

BACKGROUND ART

Devices to mount a panel on a support are known. Specification DE-A-296 22 046 describes a construction to mount a single panel on a support.

It is also known to mount two or more and in particular two panels substantially parallel to each other. Such devices may be employed to provide display advertising wherein an item of printed matter, for example a poster, is mounted onto a panel or a wall and covered with a transparent material such as perspex. Specification EP-A-0698717 describes such a construction.

It is an object of the present invention to provide an assembly for mounting two or more panels or sheets which at least provides the public with a useful choice.

SUMMARY OF THE INVENTION

Accordingly in a first aspect the present invention consists in:

an assembly for mounting two panels or sheets (hereinafter "panel"), said assembly comprising or including:

a first member capable of being mounted to, into or from a support, a second member threadingly engageable to said mounted first member, and a third member threadingly engageable to said second member when it is already threadingly engaged to said mounted first member, wherein said second member can retain a first panel (having a hole or slot) located by such hole or slot on said first member provided the hole or slot is appropriately sized, and wherein said third member can retain a second panel (having a hole or slot) located by such hole or slot on said second member provided the hole or slot is appropriately sized.

Preferably the thread of the first member is female.

Preferably the thread of the third member is male.

Preferably said third member can have its male threaded protuberance pushed through a sheet of paper or the like, to be interposed between said panels.

In other preferred forms of the present invention a number of said second members may be provided so as to enable multiple sheets of paper, etc, to be interposed between multiple panels.

Preferably said second member incorporates, a rebate so as to recess said second member therein.

Alternatively said first panel may be substantially planar, that is not including the rebate.

In another aspect the present invention consists in a method of mounting two or more panels or sheets "hereinafter panel" comprising or including the steps of providing a first member, said first member being mounted to, into or from a support, providing a second member threadably engageable with said mounted first member, and providing a third member threadably engageable to said second member when it is threadfully engaged to said mounted first member, retaining a first panel having a hole or slot therein located by such a hole or slot on said first member by threadably engaging said second member to said first member, and retaining a second panel by means of threadably engaging said third member to said second member through an appropriately sized hole or slot in said second panel.

Preferably the thread of the first member is female.

Preferably the thread of the third member is male.

Preferably when said third member is engaged with said second member the male portion of said third member pieces printed matter such as a poster.

BRIEF DESCRIPTION OF THE DRAWINGS

Preferred forms of the present invention will now be described with reference to the accompanying drawings in which:

FIG. 12a is a cross sectional view of another form of the member 6 as per a preferred form of the present invention; whereas

DESCRIPTION OF THE PREFERRED EMBODIMENTS

The present invention provides assemblies for mounting two or more panels or sheets, such an arrangement is often employed in the advertising industry to enable printed matter such as printed sheets to be displayed. It is often the case that a graphic work such as an advertisement is required to be displayed mounted on a first panel 3 but protected by a second panel 4 which may comprise, for example, a perspex sheet.

Figure 17:
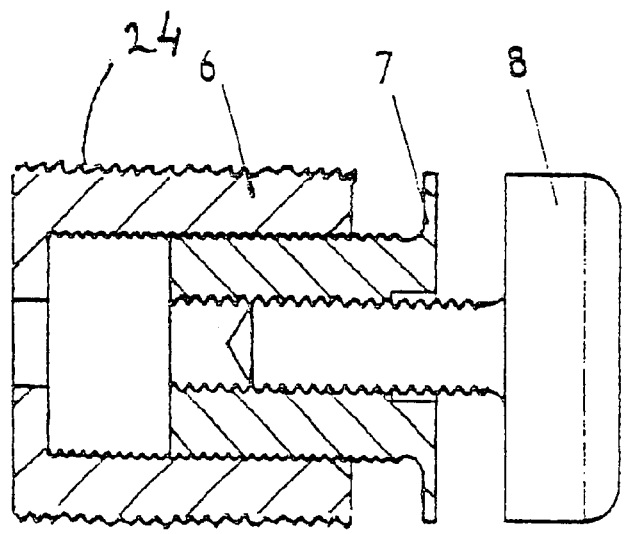
FIG. 17 shows a unit where the first member 6 has an external thread to allow it to be secured into an aperture such as a hole in a wall or the like to allow screw-like engagement.
Figure 18:
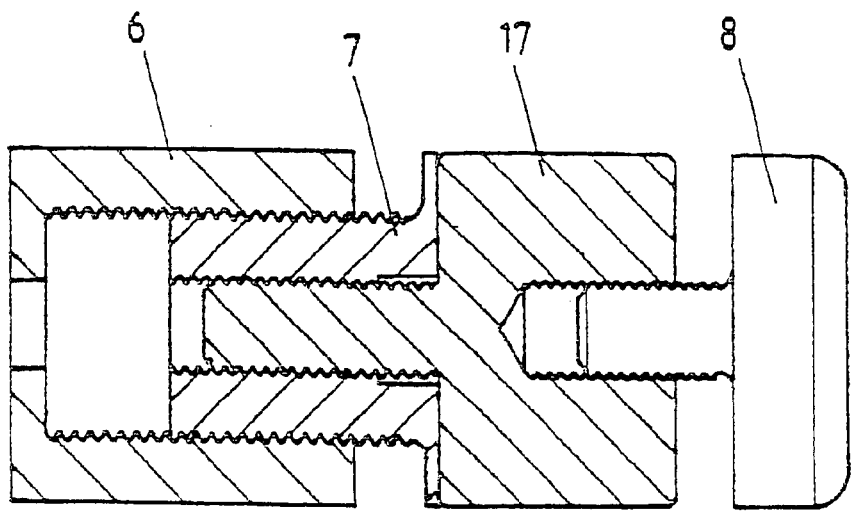
FIG. 18 shows incorporation of a spacer unit, for example a spacer unit as shown in FIG. 16 in an assembled form of the present invention.

As shown in the figures the present invention provides an assembly for mounting two or more panels or sheets 3, 4. The assembly comprises a first member 6, said first member is capable of being mounted to, onto, into or from a support which may be a support surface such as a wall. Such mounting may take the form of a screw or bolt 23 or may simply comprise adhesive mounting, for example by use of glue. In other forms of the invention the first member 6 may be unitary with said support surface, for example, it may be moulded onto the interior surface of a transport vehicle such as a train, ferry or bus. The first member may also for example be provided with an external thread 24 as shown in FIG. 17 for the threading of the first member at least in part into a hole or aperture. The thread 24 may be such as to allow the first member to thread into a threaded aperture or alternatively maybe provided with for example a tapper such as to allow this member to be screw threaded into a hole in for example a wood or metal or the like. The first member 6 should be of a material suitable to have a female thread 20 therein. In preferred forms of the invention the first member 6 has a hole drilled therethrough and a thread placed on an internal surface of said hole. Those skilled in the art to which the invention relates will be aware of many techniques for including such a thread.

The second member 7 may take a variety of forms but should include a portion which has a thread capable of engaging with the female thread 20 of said first member 6. In the preferred form of the present invention wherein a single second member 7 is provided, said second member should include a portion having a female thread therein which is engageable with the male thread 21 of said third member 8. In the alternative preferred forms of the invention wherein multiple second members are provided, for example, 17 and 27, said first second member 7 includes a thread, preferably female which is engageable with a thread preferably male on said additional said second member Table 1 shows the dimensions of a standard unit in assembly according to a preferred form of the present invention utilising components of the preferred standard size.

| Standard Unit | | | |
|---|---|---|---|
| Spacing Off Wall | Back Panel | Front Panel | Components |
| 15 mm | 0–6 mm | 0–7 mm | A1 + B1 + C2 |

Table 2 shows the use of variously sized components to provide an assembly as per other preferred forms of the present invention.

| Standard Unit | | | |
|---|---|---|---|
| Spacing Off Wall | Back Panel | Front Panel | Components |
| 15 mm | 0–6 mm | 0–1 mm | A1 + B1 + C1 |
| 15 mm | 0–6 mm | 0–7 mm | A1 + B1 + C2 |
| 15 mm | 3–6 mm | 7–16 mm | A1 + B1 + C3 |
| 15 mm | 0–6 mm | 10–16 mm | A1 + B1 + C3 |
| 15 mm | 0–6 mm | 16–22 mm | A1 + B1 + C4 |
| 15 mm | 6–11 mm | 0–1 mm | A1 + B2 + C1 |
| 15 mm | 6–11 mm | 0–7 mm | A1 + B2 + C2 |
| 15 mm | 6–11 mm | 5–16 mm | A1 + B2 + C3 |
| 15 mm | 6–11 mm | 11–22 mm | A1 + B2 + C4 |
| 15 mm | 17–22 mm | 0–8 mm | A1 + B3 + C3 |
| 15 mm | 17–22 mm | 0–14 mm | A1 + B3 + C4 |
| 20 mm | 0–8 mm | 0–1 mm | A2 + B1 + C1 |
| 20 mm | 0–6 mm | 0–7 mm | A2 + B1 + C2 |
| 20 mm | 0–6 mm | 10–16 mm | A2 + B1 + C3 |
| 20 mm | 0–6 mm | 16–22 mm | A2 + B1 + C4 |
| 20 mm | 0–11 mm | 0–1 mm | A2 + B2 + C1 |
| 20 mm | 0–11 mm | 0–7 mm | A2 + B2 + C2 |
| 20 mm | 0–11 mm | 5–16 mm | A2 + B2 + C3 |
| 20 mm | 0–11 mm | 11–22 mm | A2 + B2 + C4 |
| 20 mm | 8–22 mm | 0–8 mm | A2 + B3 + C3 |
| 20 mm | 8–22 mm | 0–14 mm | A2 + B3 + C4 |
| 25 mm | 0–6 mm | 0–1 mm | A3 + B1 + C1 |
| 25 mm | 0–6 mm | 0–7 mm | A3 + B1 + C2 |
| 25 mm | 0–6 mm | 10–16 mm | A3 + B1 + C3 |
| 25 mm | 0–6 mm | 16–22 mm | A3 + B1 + C4 |
| 25 mm | 0–11 mm | 0–1 mm | A3 + B2 + C1 |
| 25 mm | 0–11 mm | 0–7 mm | A3 + B2 + C2 |
| 25 mm | 0–11 mm | 5–16 mm | A3 + B2 + C3 |
| 25 mm | 0–11 mm | 11–22 mm | A3 + B2 + C4 |
| 25 mm | 7–22 mm | 0–8 mm | A3 + B3 + C3 |
| 25 mm | 7–22 mm | 0–14 mm | A3 + B3 + C4 |

Table 3 shows yet another preferred form of the present invention in which a spacer is provided between the sheets or panels.

| Standard Unit | | | |
|---|---|---|---|
| Spacing Off Wall | Back Panel | Front Panel | Components |
| 15 mm | 0–6 mm | 0–3 mm | A1 + B1 + C1 + D1 |
| 15 mm | 0–6 mm | 0–3 mm | A1 + B1 + C1 + D2 |
| 15 mm | 6–11 mm | 0–3 mm | A1 + B2 + C1 + D1 |
| 15 mm | 6–11 mm | 0–3 mm | A1 + B2 + C1 + D2 |
| 20 mm | 0–8 mm | 0–3 mm | A2 + B1 + C1 + D1 |
| 20 mm | 0–6 mm | 0–3 mm | A2 + B1 + C1 + D2 |
| 20 mm | 0–11 mm | 0–3 mm | A2 + B2 + C1 + D1 |
| 20 mm | 0–11 mm | 0–3 mm | A2 + B2 + C1 + D2 |
| 25 mm | 0–6 mm | 0–3 mm | A3 + B1 + C1 + D1 |
| 25 mm | 0–6 mm | 0–3 mm | A3 + B1 + C1 + D2 |
| 25 mm | 0–11 mm | 0–3 mm | A3 + B2 + C1 + D1 |
| 25 mm | 0–11 mm | 0–3 mm | A3 + B2 + C1 + D2 |

In preferred forms of the invention said third member 8 includes a point or protuberance 22 thereon, said point 22 being capable of piercing sheets which is printed paper. In other forms of the invention said third member 8 has no such point and accordingly a suitable aperture should be placed through said printed sheet for it is incorporated into said assembly. An appropriately shaped top region 26 of the internal thread of the second member 7 can be provided such as to allow for, for example an allan key of the like securing means to tighten the second member in its fully engaged condition. The top region is preferably of a shape to receive and to allow the second member to be driven by such a fastening means as an allan key.

Said first 6, second 7, and third 8 members are produced from a variety of several materials. For example, may be produced from a variety of suitable materials. For example, may be produced from a suitable metal and may for example be machined out of a suitable diameter rod of said metal. Other forms of the invention may comprise moulded members. As mentioned previously said second member 7 may be rebated into said first panel 3 or may in other forms of the invention overly said panel 3. In the forms of the invention where it is rebated the second panel 4 may be brought down into close contact with said printed sheet 5 and said first panel 3. This may help keep the printed sheet 5 flat.

In forms of the invention which employ multiple second members 7, for example 17 and 27, a number of printed sheets 5 may overly each other. Such a preferred form of the present invention may be employed to provide an interesting visual effect, for example a layering of transparent or translucent printed sheets 5. For example it may comprise the use of a printed sheet 5 which is a second sheet material overlying it. Said second sheet material may comprise for example a translucent filter, which may be coloured, to provide an interesting visual effect.

As mentioned previously said second sheet 4 preferably provides protection to said printed sheet 5. As such it may be used from a variety of materials such as perspex, other clear or translucent sheet, plastics material or it may comprise glass. A wide variety of materials may be used to produce said first sheet 3. For example it may comprise a sheet of wood or wood product such as medium density fibreboard. In other forms of the invention it may comprise a sheet of suitable plastic material such as perspex. The sheet material may be translucent, transparent or opaque. In other forms of the invention the first sheet 3 may comprise a sheet of metal.

Figure 1:
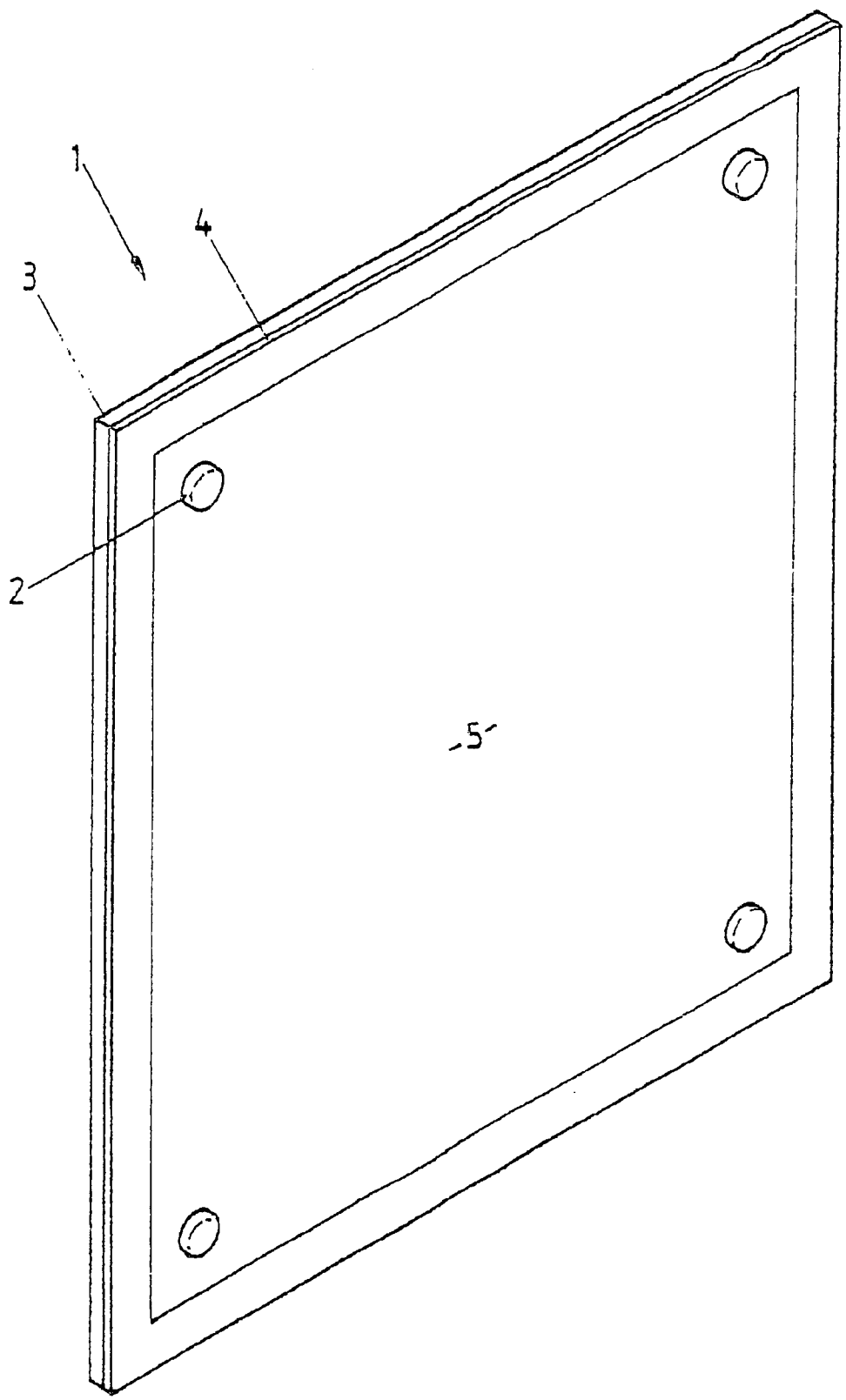
FIG. 1 shows a perspective view of an assembly of two panels 1 according to a preferred form of the present invention, the panels 3 and 4 are mounted substantially parallel and overlying each other by means of an assembly for mounting two or more panels of sheets 2, the assembly 1 incorporates, between said first 3 and second 4 panel, a sheet 5, said sheet being preferably a sheet of printed paper or card or similar, for example advertising for other graphic work; the second sheet 4 is preferably of a perspex or other suitable transparent or translucent second material.
Figure 2:
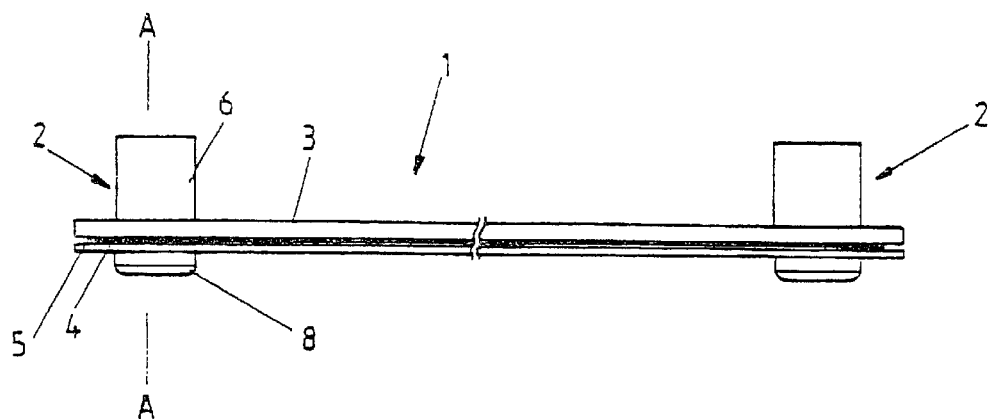
FIG. 2 shows a top and, given the shape of the preferred form of the present invention illustrated, bottom and side views of an assembly 1 according to a preferred form of the present invention, it should be noted that various shapes of the panels 3 and 4 are contemplated by the present invention, for example squares, rectangles or other shapes including various straight side or planar shapes and also shapes incorporating curves such as circular panels, the FIG. 2 also shows the assembly for mounting two or more panels or sheets 2 and shows the first member 6 and the third member 8, the second member 7 is not shown in this figure as it is not visible due to the fact that in some preferred forms of the invention it is rebated into the first panel 3.
Figure 3:
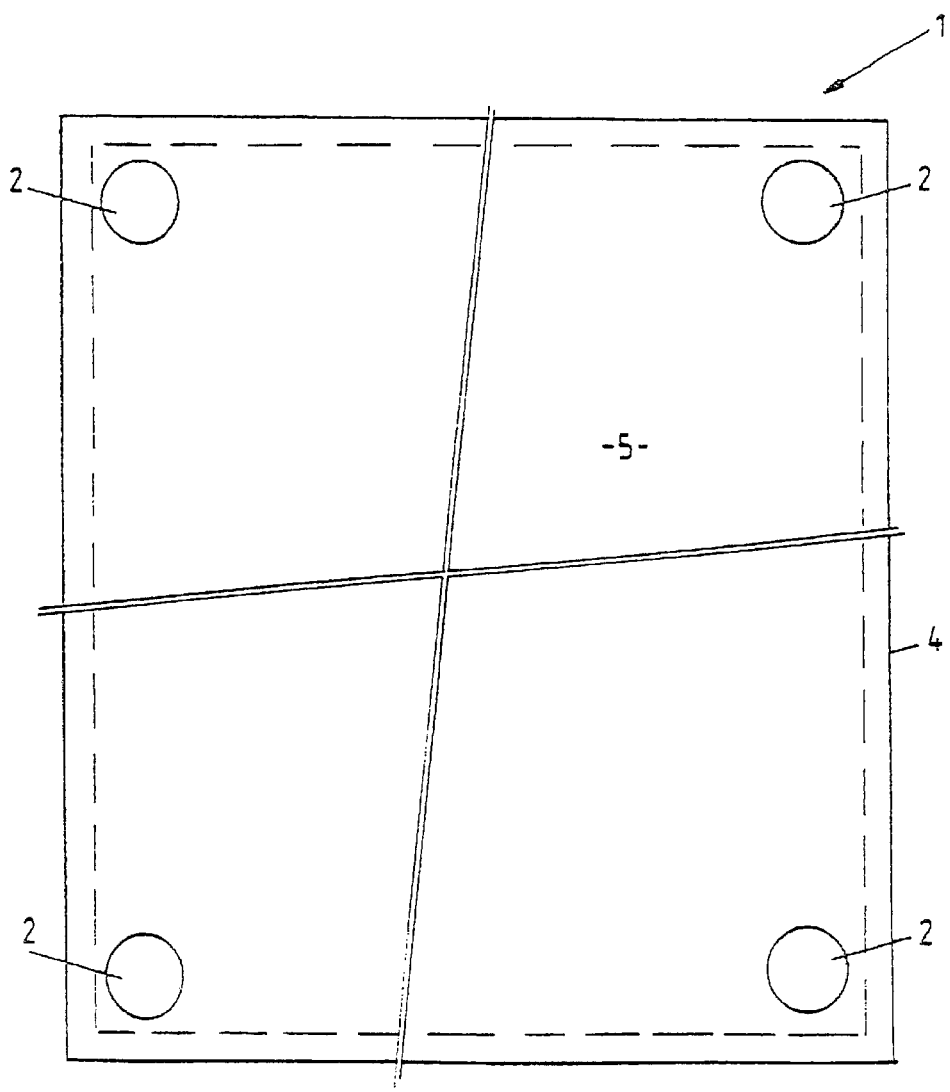
FIG. 3 shows a front view of an assembly of two panels mounted using assemblies for mounting panels according to a preferred form of the present invention, as mentioned above this preferred form of the invention shows a rectangular panel having the assemblies for mounting two panels or sheets at each corner thereof, although this is a preferred form of the invention, other shapes and positionings for the assemblies 2 are envisaged, the dotted outline in FIG. 3 shows the outline of the sheet of paper or card which is sandwiched between said first 3 and second 4 panels, the sheet 5 is at least partially visible beneath said second panel 4 as said second panel 4 is transparent or at least translucent other forms of the invention are contemplated wherein said first panel 3 is transparent or at least partially translucent and illumination means are provided on said support from which said first member 6 is mounted, in use, this may provide a degree of illumination of the sheet material 5.
Figure 4:
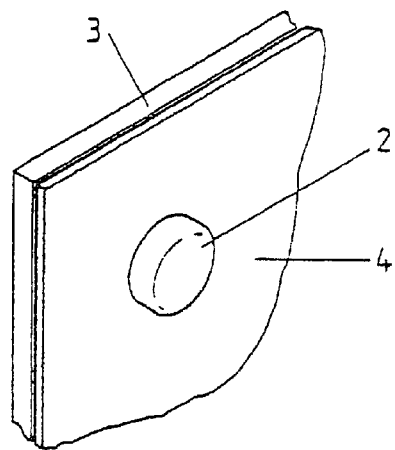
FIG. 4 shows a partial perspective view showing the arrangement of the first panel 3 and second panel 4 in relation to each other being engaged with said assembly for mounting two panels or sheets 2.
Figure 5A:
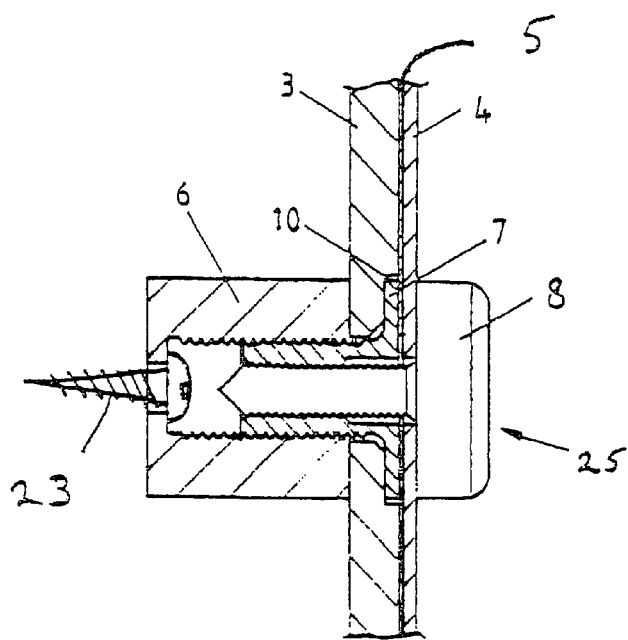
FIG. 5A shows a perspective view through A—A showing the first member 6, said second member 7 which is not visible in the previous figures, and the third member 5, the figure shows the recess or rebate 10 in said first panel 3 into which said second member 7 sits, the surface of the said first panel 3 adjacent said second panel 4 is thus flush, in other forms of the invention there may be no recess or rebate 10 and the second member 7 may sit atop the first sheet 3, although in preferred forms of the invention the first, second and third members are substantially cylindrical, it is possible there may be other forms of the invention in which this is not the case, for example the members may be octagonal or hexagonal or other shapes.
Figure 5B:
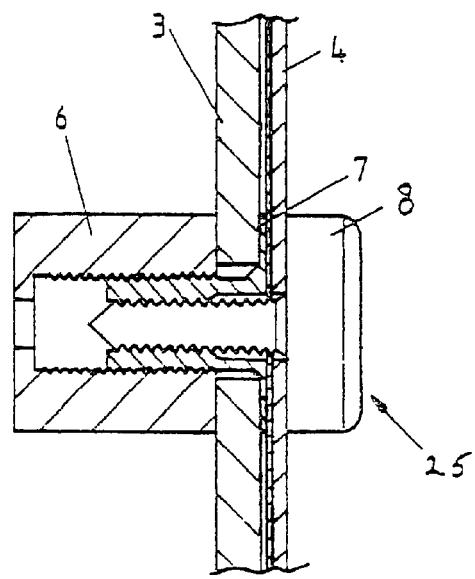
FIG. 5B is the same as FIG. 5A except that the need for the recess 10 is avoided through the use, as shown in later drawings, of a thinner flange 7.
Figure 6A:
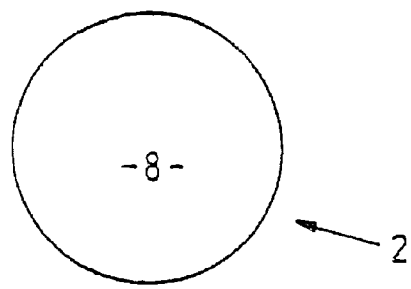
FIGS. 6 A, B and C show respectively:
a plan view;
a cross-sectional side view and a simple side view of an assembly for mounting two panels or sheets 2 according to a preferred form of the present invention, the drawings illustrate that the thread 20 of said first member 6 is female whereas the thread 21 of the third member is male, also shown in the figures is the piercing point 22 on said third member 8 which enables it to be pushed through a sheet of paper, etc, which is interposed between said first and second panels 3 and 4.
Figure 6B:
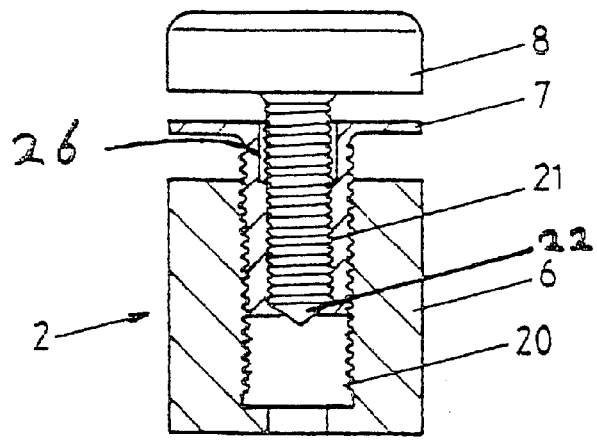
Figure 6C:
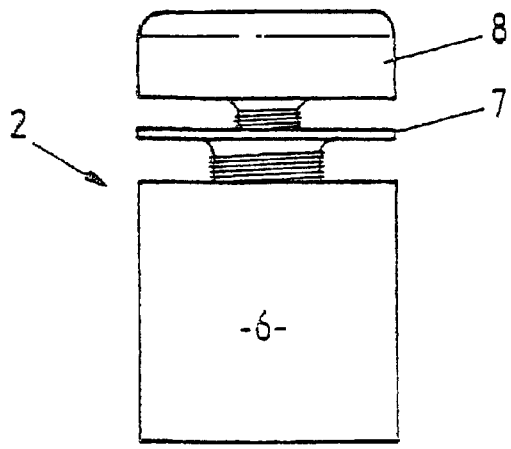
Figure 7A:
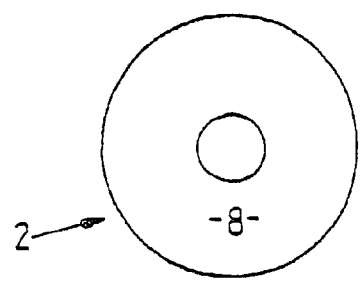
FIG. 7a is a plan view of an embodiment of assembly 2.
Figure 7B:
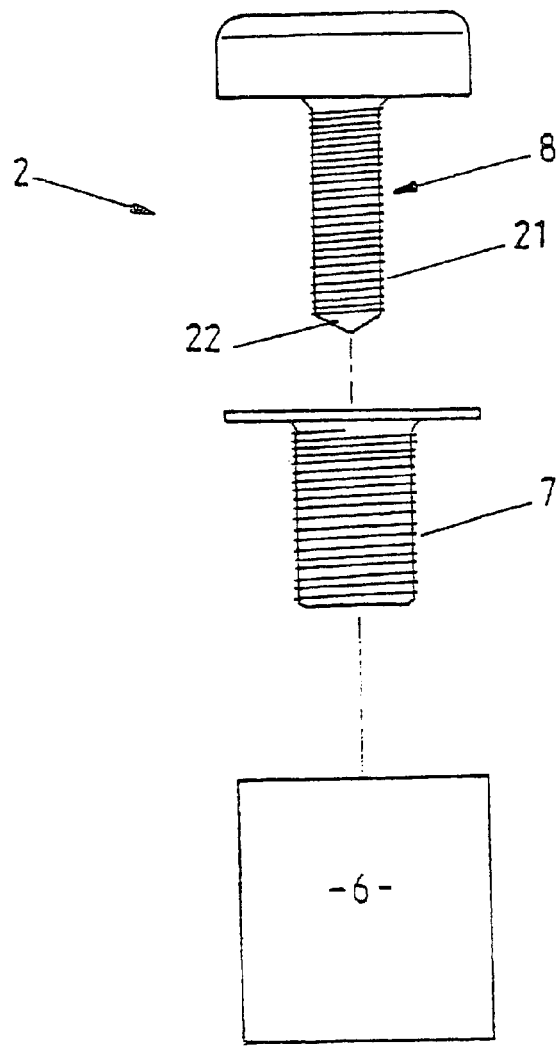
FIG. 7b is an exploded side view thereof.
Figure 8:
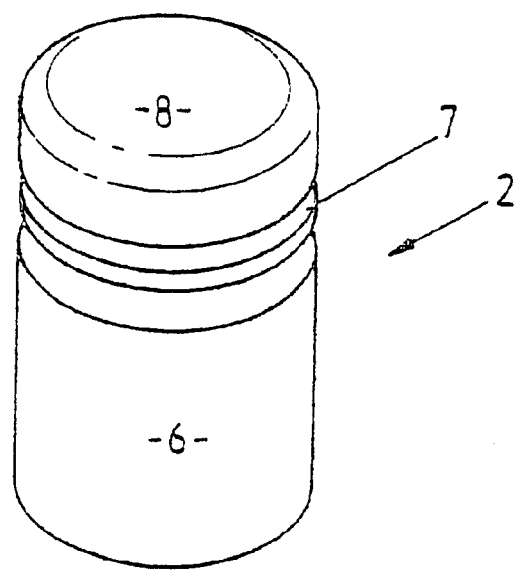
FIG. 8 shows a perspective view of an assembly for mounting two or more panels or sheets according to a preferred form of the present invention showing the first member 6, second member 7, and third member 8.
Figure 9:
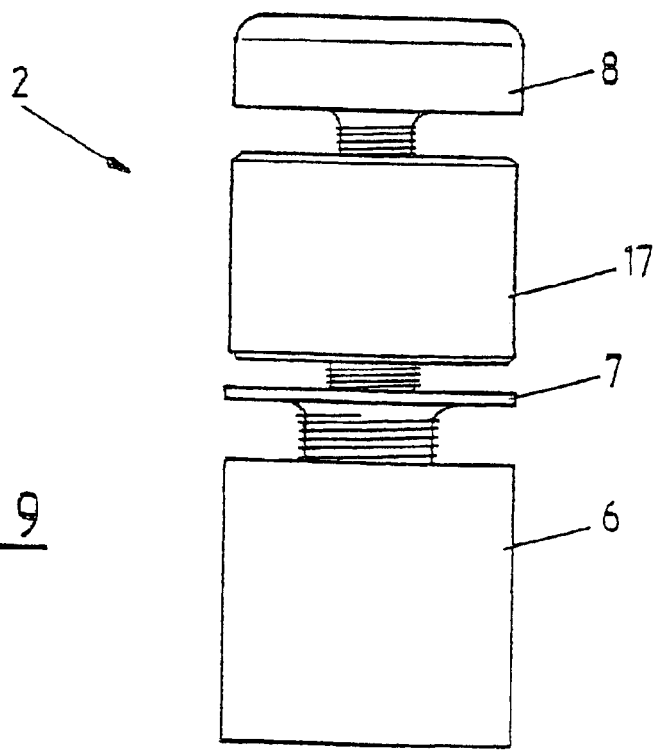
FIG. 9 shows a side view of another preferred form of the present invention which provides an assembly 2 for mounting panels or sheets, in this form of the present invention additional second members 7 are provided, these second members are designated by 17 in the FIG. 9, in other forms of the invention multiple, for example three or four second members 7 may be provided, this form of the present invention allows for a further number of panels or sheets of printed matter to be mounted adjacent each other or enables layers of sheets of paper which include graphic works, for example is designated by 5 in the previous figures to be mounted on top of each other, such an arrangement may provide for a layering effect of the graphic work.
Figure 10:
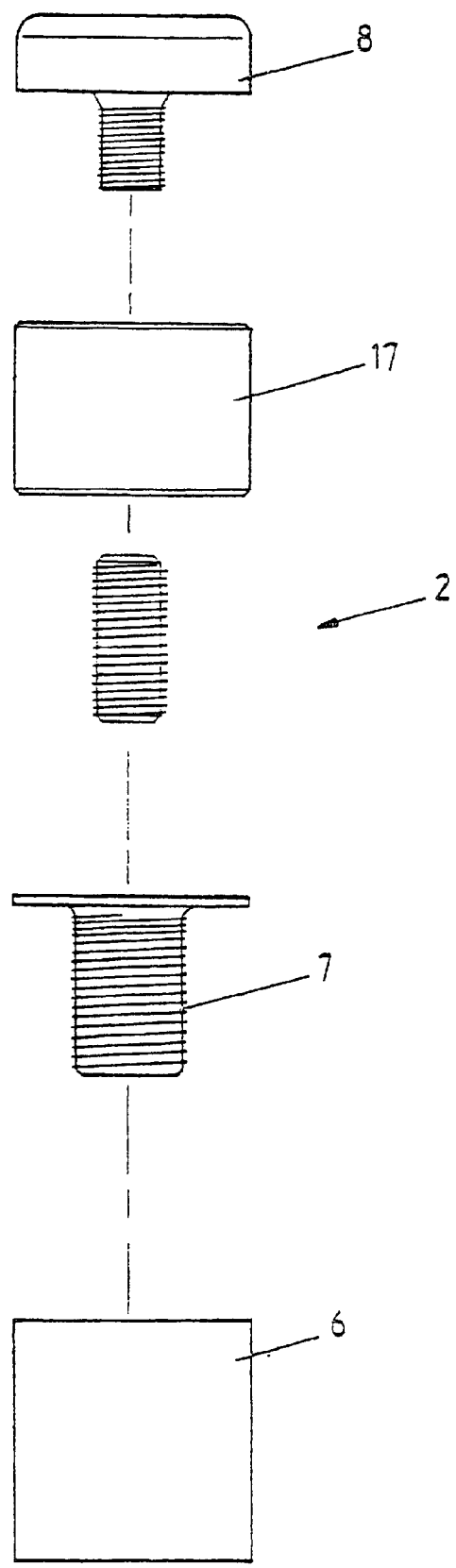
FIG. 10 shows a side view of an assembly for mounting panels 2 according to a preferred form the present invention, said figures showing the additional second member 17.
Figure 11:
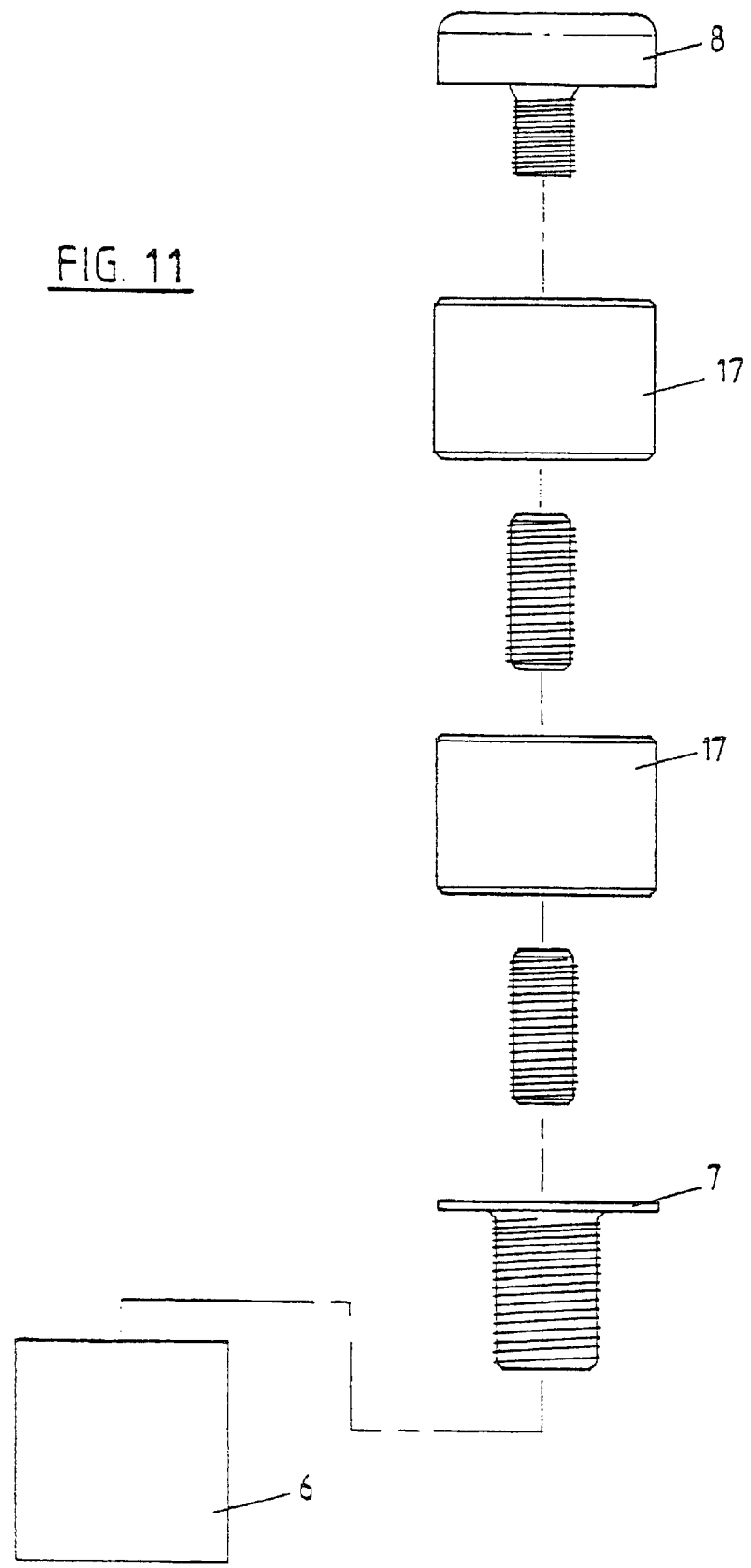
FIG. 11 shows a side view of another form of the present invention wherein a third second member 27 is provided.
Figure 12A:
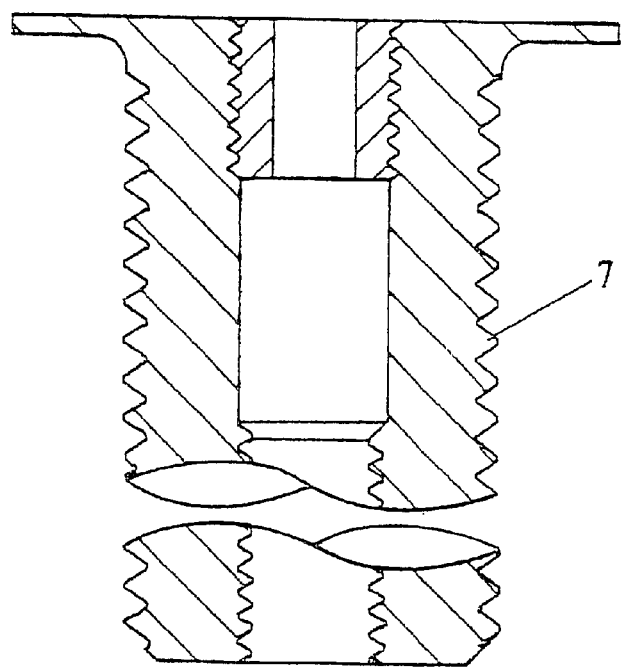
Figure 12B:
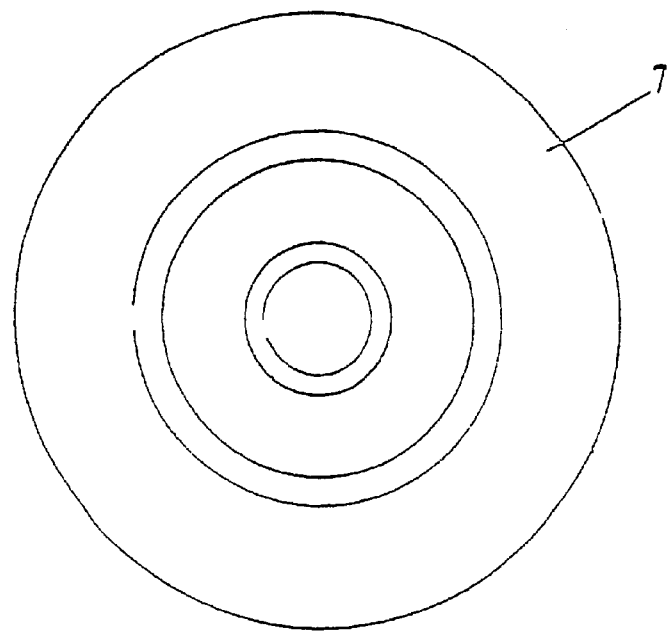
FIG. 12b is a plan view of such a member 7.
Figure 13A:
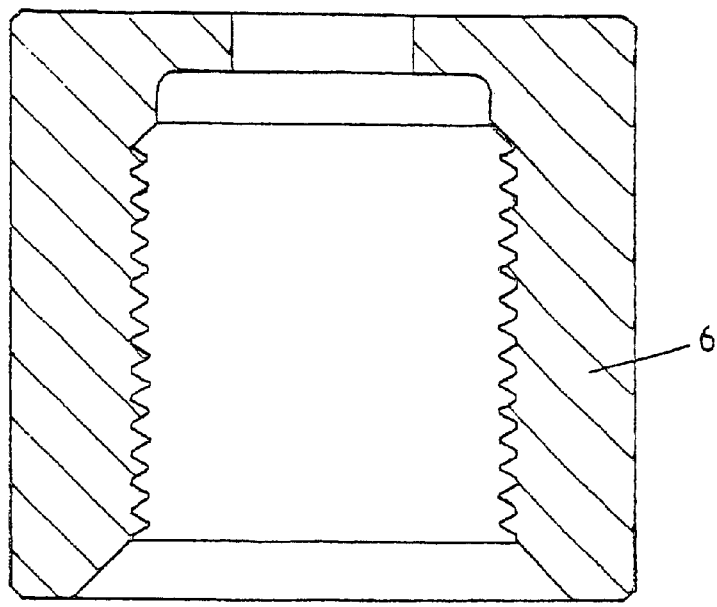
FIG. 13a is a cross sectional view of a member 6 according to another preferred form of the present invention.
Figure 13B:
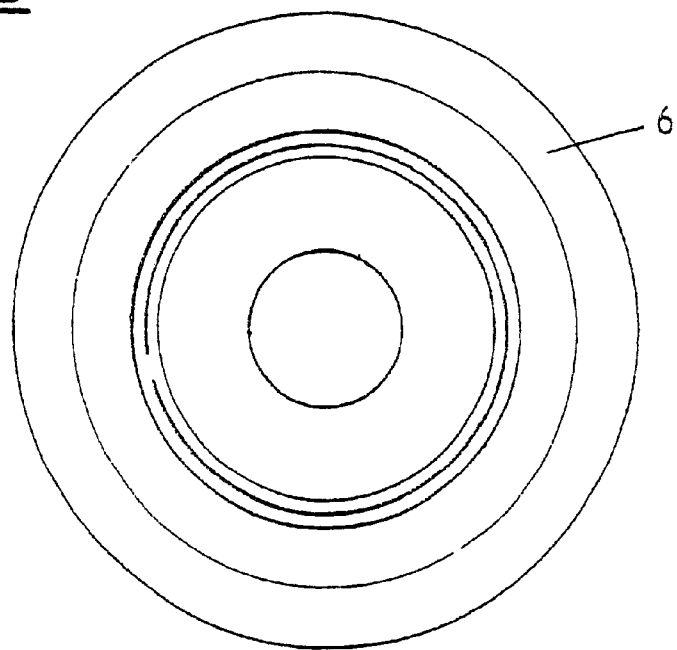
FIG. 13b is a plan view of such a member 6.
Figure 14A:
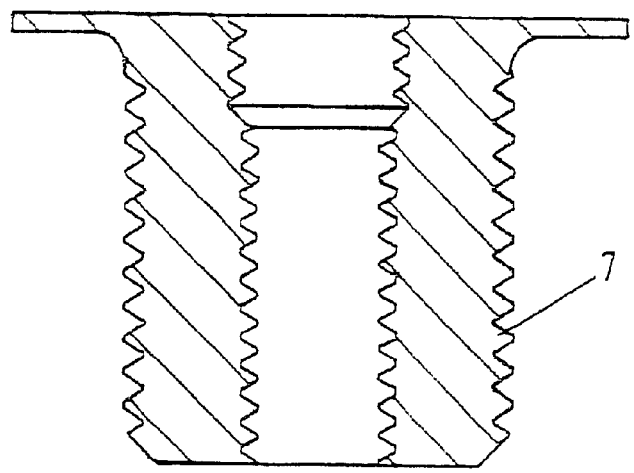
FIG. 14a and b show a cross sectional view of the plan of yet another member 7 according to a preferred form of the present invention.
Figure 14B:
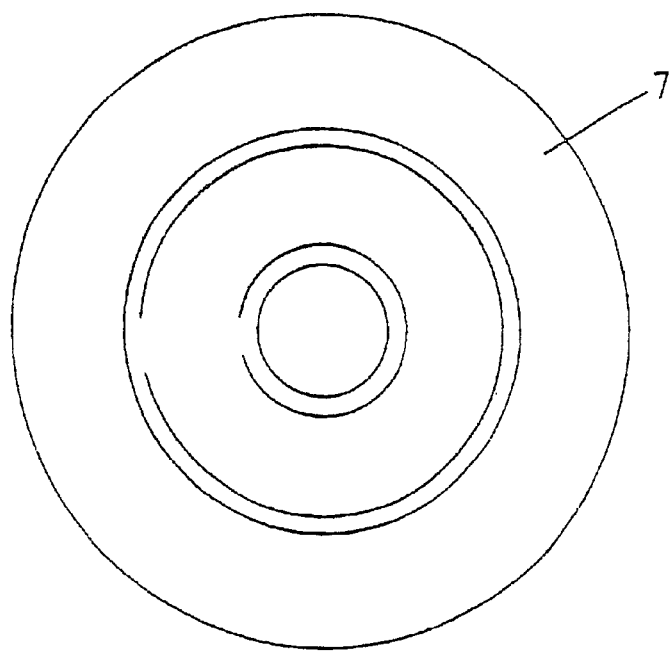
Figure 15:
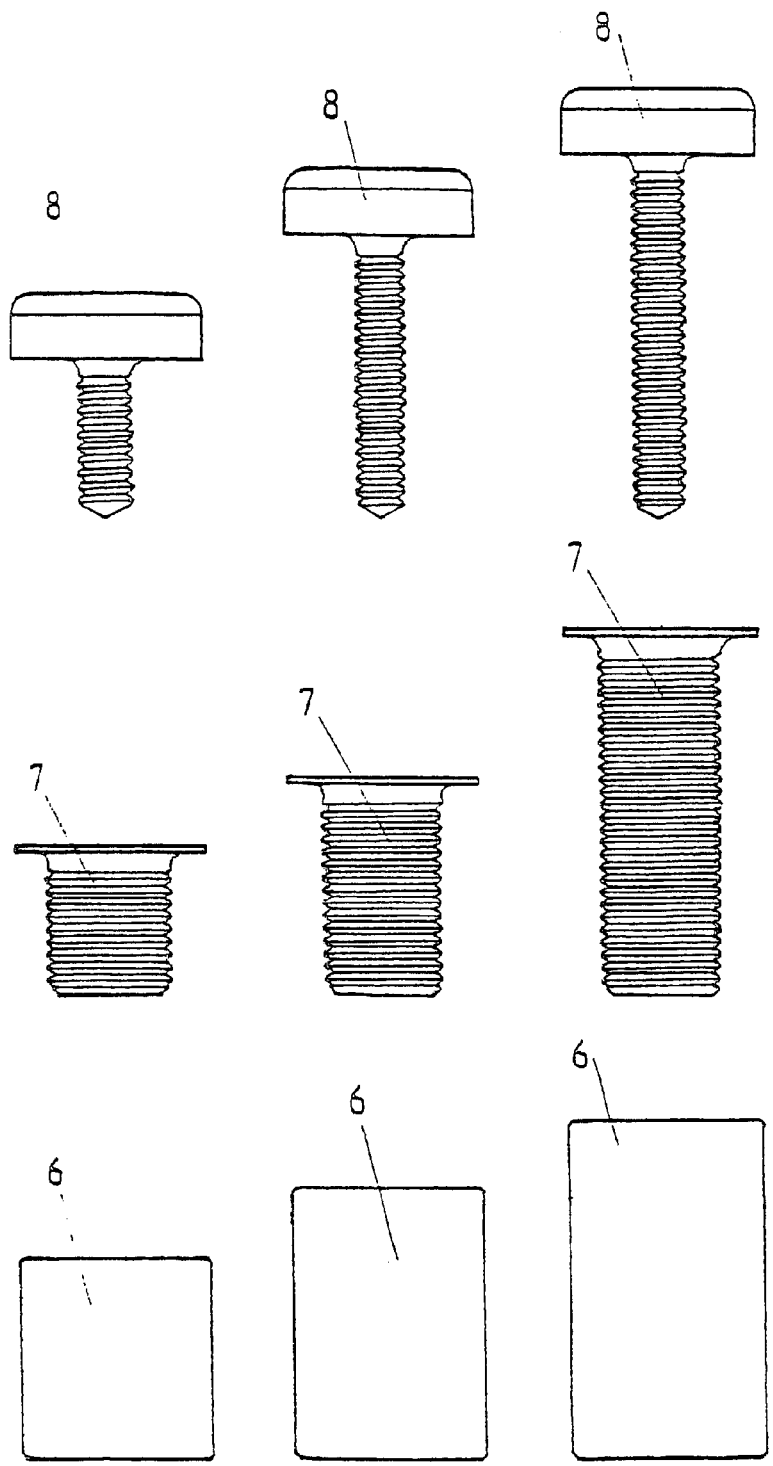
FIG. 15 shows various standard units as outlined in Table 1 and 2.
Figure 16:
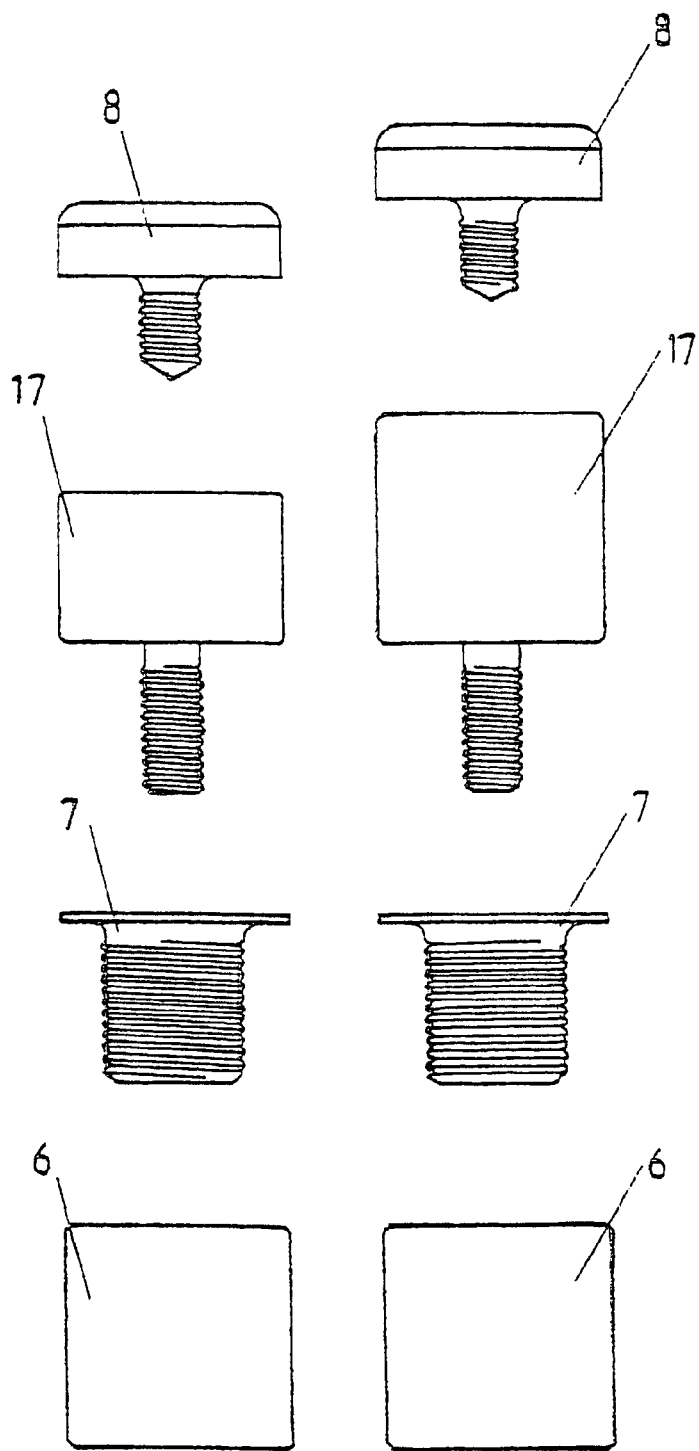
FIG. 16 shows side elevations of various members as outlined in Table 3.

Preferably, as shown in at least FIG. 5B, recesses 10 are avoided by the provision of very thin Flanges 7. The method of assembly using the invention as herein described preferably comprises the steps of securing the first member 6 to a support either by a threaded engaging means 23 as for example shown in FIG. 5A or by an adhesive or alternatively by for example threading the first member into a hole of a support utilising for example an external thread as shown in FIG. 17. Any number of suitably spaced units can be provided on such a support and, in for example FIG. 3, there are provided four such assemblies. A first sheet, with aperture(s) can then be secured to the or each of the assemblies by threading said second member into the thread of said first member This then located relative to the first members, the first sheet of material. A second sheet can then be secured to lie substantially parallel to the first sheet, and can be held in a fixed relationship by threading the member 8 into the member 7. Between the sheets printed member matter 5 may be provided. Such printed member can be for example any advertising carrying substrate, menu board, highrise building floor numbering or any similar or the like matter.

The substrate 5 can be easily replaced by unthreading the member 8 from the member 7 thereby allowing for the substrate 5 to be removed while still allowing for the sheet 3 to remain in place and located by the member 7 and 6.

It is also envisaged that the member 8 may be provided with a head 25 which has the provisions for example receiving a screw driver to allow for the member 8 to be tightly threaded into the member 7. The head 25 may alternatively be provided with a particularly shaped recess or other like provision for receiving a complementary shaped securing means such that only that or the like securing means can fasten and unfasten the member 8. Such can be considered a security feature to prevent tampering and in particular the removal of the member 8 such that the advertising substrate can be removed or tampered with.

It can be seen that the present invention provides an assembly for mounting two or more panels or sheets and an assembly comprising said panels or sheets and said assembly which will at least provide the public with a useful choice.

What is claimed is:

1. A display assembly comprising:

two panels having corresponding openings therethrough;

plural first members;

plural second members that extend through respective ones of said openings in one of said two panels and threadingly engage respective ones of said plural first members to attach said plural first members to said one of said two panels, each of said plural first members having a first longitudinal bore that threadingly receives a respective one of said plural second members and a second longitudinal bore with a smaller diameter than said first longitudinal bore and through which said display assembly is arranged and adapted to be mounted on a support; and plural third members that extend through respective ones of said openings in a second of said two panels and threadingly engage respective ones of said plural second members to attach said second of said two panels to said one of said two panels.

2. The display assembly of claim 1, wherein said one of said two panels includes a thinned portion around each of said openings therethrough to define an annular stepped portion and each of said plural second members comprises an annular flange that fits into said annular stepped portion.

3. The display assembly of claim 1, wherein each of said plural third members includes a center piece with threaded bores in opposite sides thereof, a cap with a threaded projection that threadingly engages one of said threaded bores, and a double ended threaded member that threadingly engages another of said threaded bores and a respective one of said plural second members.

4. The display assembly of claim 1, further comprising plural mounting members that each extend through a respective one of said second longitudinal bores in said plural first members and that are spaced from an adjacent threaded end of the respective one of said plural second members when said plural second members are fully threaded into said plural first members.

5. The display assembly of claim 1, wherein each of said plural first members comprises a female thread.

6. The display assembly of claim 1, wherein each of said plural third members comprises a male thread.

7. The display assembly of claim 1, wherein each of said plural third members comprises a point at an end of said male thread for puncturing a display between said two panels.

8. The display assembly of claim 1, wherein said one of said two panels is planar.

9. The display assembly of claim 1, wherein said first and second longitudinal bores in said plural first members are coaxial.

10. A method of assembling a display comprising the steps of:

providing two panels having corresponding openings therethrough;

mounting plural first members to a support;

attaching one of the two panels to the plural first members by extending plural second members through respective ones of the openings in the one of the two panels, the plural second members threadingly engaging first longitudinal bores in respective ones of the plural first members, each of the plural first members having a second longitudinal bore with a smaller diameter than the first longitudinal bore and through which the plural first members were mounted on the support; and attaching the second of the two panels to the one of the two panels by extending plural third members through respective ones of the openings in the second of the two panels and threadingly engaging respective ones of the plural second members, the display being between the two panels.

11. The method of claim 10, further comprising the step of providing a thinned portion around each of the openings in the one of the two panels to define an annular stepped portion, where each of the plural second members includes an annular flange that fits into the annular stepped portion.

12. The method of claim 10, further comprising the step of providing each of the plural third members with a center piece with threaded bores in opposite sides thereof, a cap with a threaded projection that threadingly engages one of the threaded bores, and a double ended threaded member that threadingly engages another of the threaded bores and a respective one of the plural second members.

13. The method of claim 10, further comprising the step of providing plural mounting members that each extend through a respective one of the second longitudinal bores in the plural first members to mount the display on the support and that are spaced from an adjacent threaded end of the respective one of the plural second members when the plural second members are fully threaded into the respective plural first members.

14. The method of claim 10, further comprising the steps of providing each of the plural third members with a pointed end and puncturing the display with the pointed end.

* * * * *